US009463371B1

(12) United States Patent
Breu

(10) Patent No.: US 9,463,371 B1
(45) Date of Patent: Oct. 11, 2016

(54) SKI HOLD-DOWN CLAMP WITH ACTUATION PEDAL

(71) Applicant: Peter Breu, Manchester, NH (US)

(72) Inventor: Peter Breu, Manchester, NH (US)

( * ) Notice: Subject to any disclaimer, the term of this patent is extended or adjusted under 35 U.S.C. 154(b) by 103 days.

(21) Appl. No.: 14/506,283

(22) Filed: Oct. 3, 2014

Related U.S. Application Data

(60) Provisional application No. 61/887,230, filed on Oct. 4, 2013.

(51) Int. Cl.
*B23Q 3/00* (2006.01)
*A63C 11/08* (2006.01)
*B25B 5/14* (2006.01)

(52) U.S. Cl.
CPC *A63C 11/08* (2013.01); *B25B 5/14* (2013.01)

(58) Field of Classification Search
CPC ........... B25B 1/16; B25B 5/003; B25B 5/10; B25B 5/145
See application file for complete search history.

(56) References Cited

U.S. PATENT DOCUMENTS 2,631,483 A 3/1953 Swain
4,653,740 A 3/1987 Meissner
5,127,639 A 7/1992 Tucker et al.

OTHER PUBLICATIONS

Idaho Mountain Touring, "Swix Sport Super Jaws Ski Vise", Oct. 3, 2014, Publisher: http://www. idahomountaintouring.com/product/12swix-sport-swix-t0149-9-super-jaws-ski-vise-2397.htm, Published in: US.

*Primary Examiner* — Lee D Wilson
(74) *Attorney, Agent, or Firm* — Loginov & Associates, PLLC; William A. Loginov

(57) ABSTRACT

A ski hold-down clamp is comprised of a clamp head assembly, a clamping device, a cable and the actuation pedal. A pair of counterpoised clamp plates retains the orientation of an engaged ski by actively engaging the ski side walls. The clamp head assembly is comprised of clamp plates, a clamp ski support, a plurality of spring assemblies, a cable, and a vertical support bolt. The clamp head assembly is connected to the clamping device by the vertical support bolt. The ski clamp support is transversely bisected by a pair of through-bolts are a fulcrum for the movement of the clamp plates. The cable passes through the clamp plates and is retained by cable retainer. When the foot pedal is actuated, the cable is retracted. This movement causes a force to be applied to clamp plate, creating a compression of the clamp plate against a spring assembly.

9 Claims, 4 Drawing Sheets

SKI HOLD-DOWN CLAMP WITH ACTUATION PEDAL

FIELD OF THE INVENTION

Related Applications

This application claims the benefit of U.S. Provisional Application Ser. No. 61/887,230, filed Oct. 4, 2013, entitled SKI HOLD-DOWN CLAMP WITH ACTUATION PEDAL, the entire disclosure of which is herein incorporated by reference.

FIELD OF INVENTION

The field of this invention relates to ski equipment and more particularly, to ski equipment for waxing skis.

BACKGROUND OF THE INVENTION

Skiing traces its roots to ancient times. More recently, skis have developed along several courses, including Alpine style skis, Nordic style skis and mountaineering skis. Most skis require preparation of their bases with waxes. Waxing preparations can include waxes to increase the speed of the skis (i.e., "glide") and waxes that increase the friction (i.e., "grip") of the skis. Other preparations include sealant products to protect the bases of the skis. Nordic and mountaineering style skis can require sealants, speed waxes and friction waxes, while Alpine skis use sealants and speed waxes.

Glide waxes are composed of different components used to reduce wet friction. For example, paraffin wax, both natural and synthetic, has been a widely used material. Older materials used have included pine tar and food grade oils. Synthetic materials currently used to control wet friction include but are not limited to silicon, PTFE, fluorocarbons, graphite, molybdenum and gallium. The type of glide wax is selected based primarily on snow temperature, as well as the crystal structure and relative humidity of the snow. Nordic skis will be waxed primary around the ski tips and tails, while jumping skis, skating skis and Alpine skis can be waxed with glide wax along the entire length of the bottom.

Grip waxes include hard grip waxes and liquid grip waxes ("klister") and are used primarily in the classic form of Nordic skiing Hard waxes are used for new snow conditions with a clearly defined crystal structure, and sometimes for older, cold snow. Klister is applied when conditions are below freezing and the snow has lost good crystal structure, or when the temperature is above freezing. Grip waxes are applied in the central portion of the ski bottom, in a region referred to as the "kick zone".

Waxes are applied using a variety of techniques and mechanisms. Heating application is a popular method with hard waxes and glide waxes. The wax is heated and melted so as to drip onto the bottom. After cooling, the wax can be buffed smooth, scraped and/or brushed. A self contained, heatable waxing iron is a popular heating application mechanism. The wax can be applied cold and subjected to heating by iron or torch, smeared and then finished with scraping, buffing and/or brushing. Other waxes can be in the form of a paste, liquid, spray-on, and/or rub-on product. Another application form is the "hairy" application that is comprised of applying melted P-Tex® and brushing until the surface is textured with P-Tex® hairs. P-Tex® is a ski base material that is composed of ultra high molecular weight polyethylene and is self-lubricating, has a low coefficient of friction, a low moisture absorption rate and a high resistance to abrasion.

Preparation of the ski base for wax and/or P-Tex® application can include the use of various solvents and cleaners with handheld wipes (cloth, paper or synthetic materials).

Waxing tools include corks, scrapers, wipes, brushes, torches and irons. Vises and clamps are employed to hold the ski in a secure position so as to make the waxing application and removal more efficient. Placing a ski into a clamp consists of opening the clamp, placing the ski and re-securing the clamp. When the waxing has been completed, the clamp is opened. The process of securing and un-securing the clamp adds to the complexity of the waxing process and additional time.

It is therefore desirable to provide a ski clamp that secures the ski during wax application and removal and base preparation and that is readily actuated and efficient to use.

SUMMARY OF THE INVENTION

This invention overcomes disadvantages of prior art by providing a ski clamp that is normally biased in a closed configuration until actuated by a foot pedal. A ski hold-down clamp with actuation pedal is comprised of a clamp head assembly that is comprised of a pair of counterpoised clamp plates, a clamp ski support, at least one spring assemblies and a vertical support bolt; a clamping device; a cable; and a pedal assembly. The clamp head assembly is provided with two spring assemblies. The actuation of the pedal assembly causes the cable to move, drawing a bottom of a clamp plate against a bias of the spring assembly, moving a top of the clamp plate from a closed configuration to an open configuration. The pedal assembly can be operated by a hand or a knee. The clamp plate is constructed and arranged to confront a sidewall of a ski. A ski is removably engaged between a plurality of clamp plates in a closed configuration. A method for removably engaging a ski into a ski hold-down clamp comprising: applying pressure to a pedal of a pedal assembly with a foot; moving the pedal of the pedal assembly to move a cable, drawing a bottom of a clamp plate against a bias of the spring assembly, moving a top of the clamp plate from a closed configuration to an open configuration; placing a ski into the opening between the clamp plates on the clamp ski support; removing the foot from the pedal of a pedal assembly so that the bias of the spring assembly moves the top of the clamp plate into confrontation with the sidewall of the ski in an engaged configuration. A method for removably disengaging a ski from a ski hold-down clamp comprising: applying pressure to a pedal of a pedal assembly with a foot; moving the pedal of the pedal assembly to move a cable, drawing a bottom of a clamp plate against a bias of the spring assembly, moving a top of the clamp plate from an engaged configuration to an open configuration; removing a ski from the opening between the clamp plates; removing the foot from the pedal of a pedal assembly so that the bias of the spring assembly moves the top of the clamp plate into a closed configuration.

BRIEF DESCRIPTION OF THE DRAWINGS

The invention description below refers to the accompanying drawings, of which.

DETAILED DESCRIPTION

Figure 1:
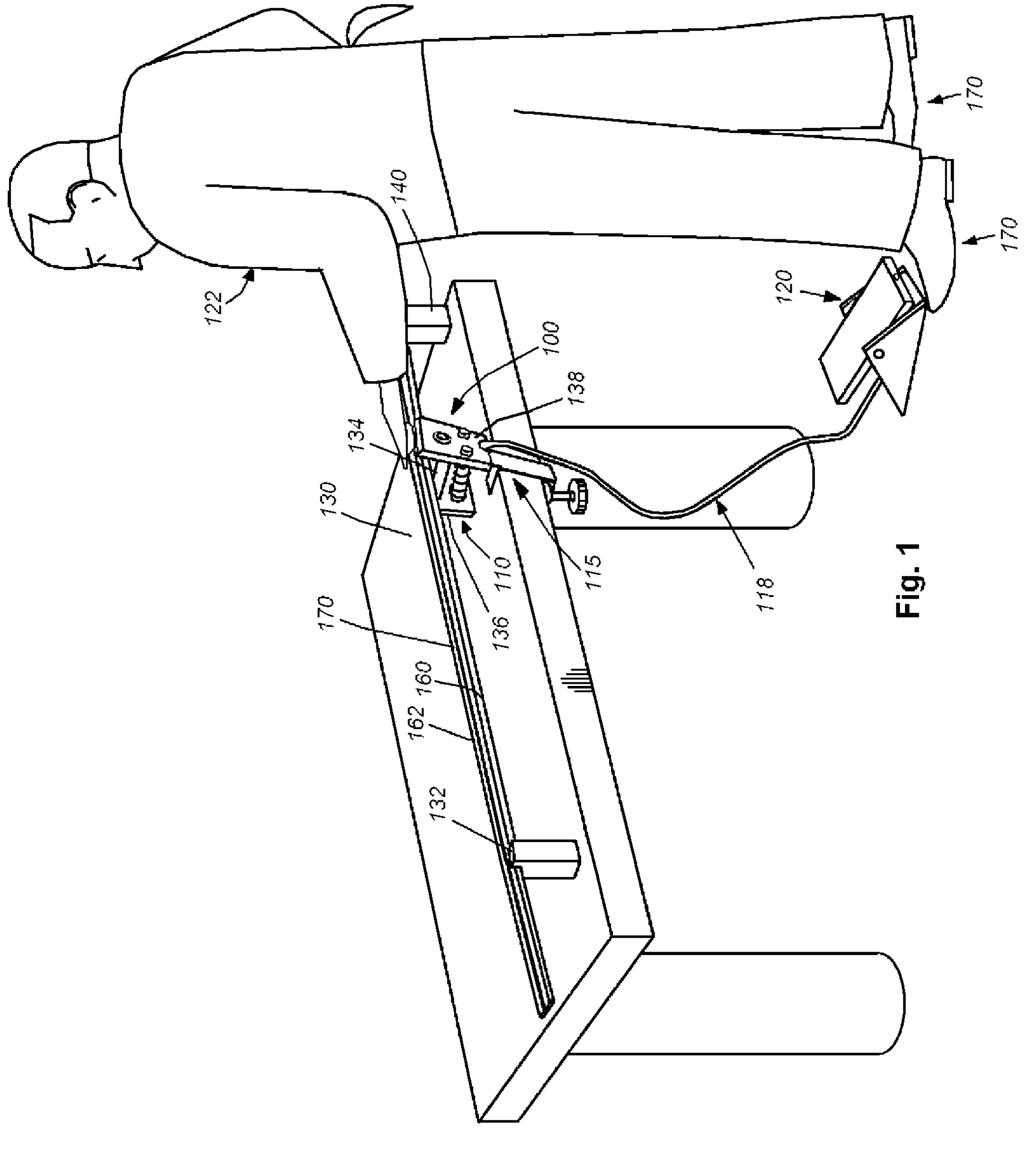
FIG. 1 is a perspective view of a ski hold-down clamp assembly, according to an illustrative embodiment.

A ski hold-down clamp assembly 100 with an actuation pedal 120 is shown in FIG. 1. The clamp assembly 100 is comprised of a clamp head assembly 110, a clamping device 115, a cable 118 and the actuation pedal 120. An operator 122 is working on a ski 130 that is supported by a rear ski support 132 and a clamp ski support 134. A pair of counterpoised clamp plates 136, 138 retains the orientation of the ski 130. An optional forward ski support 140 is supporting the forward end of the ski. The clamp head assembly 110 is constructed and arranged so that the clamp plate 136, 138 actively engage side walls 160, 162 of the ski with a confronting force, as will be described more fully below. This creates a removable fixation of the ski so that the operator 122 can perform service upon a bottom 170 of the ski 130 with sufficient vigor without the ski slipping, wobbling or skewing. The clamp assembly is normally biased closed. When the operator 122 desires to remove the ski 130 from the clamp head assembly 110, the operator engages the pedal 120 with a foot 170 and the clamp plates 136, 138 are opened so that the ski can be moved and/or removed, as will be described more fully below.

Figure 2:
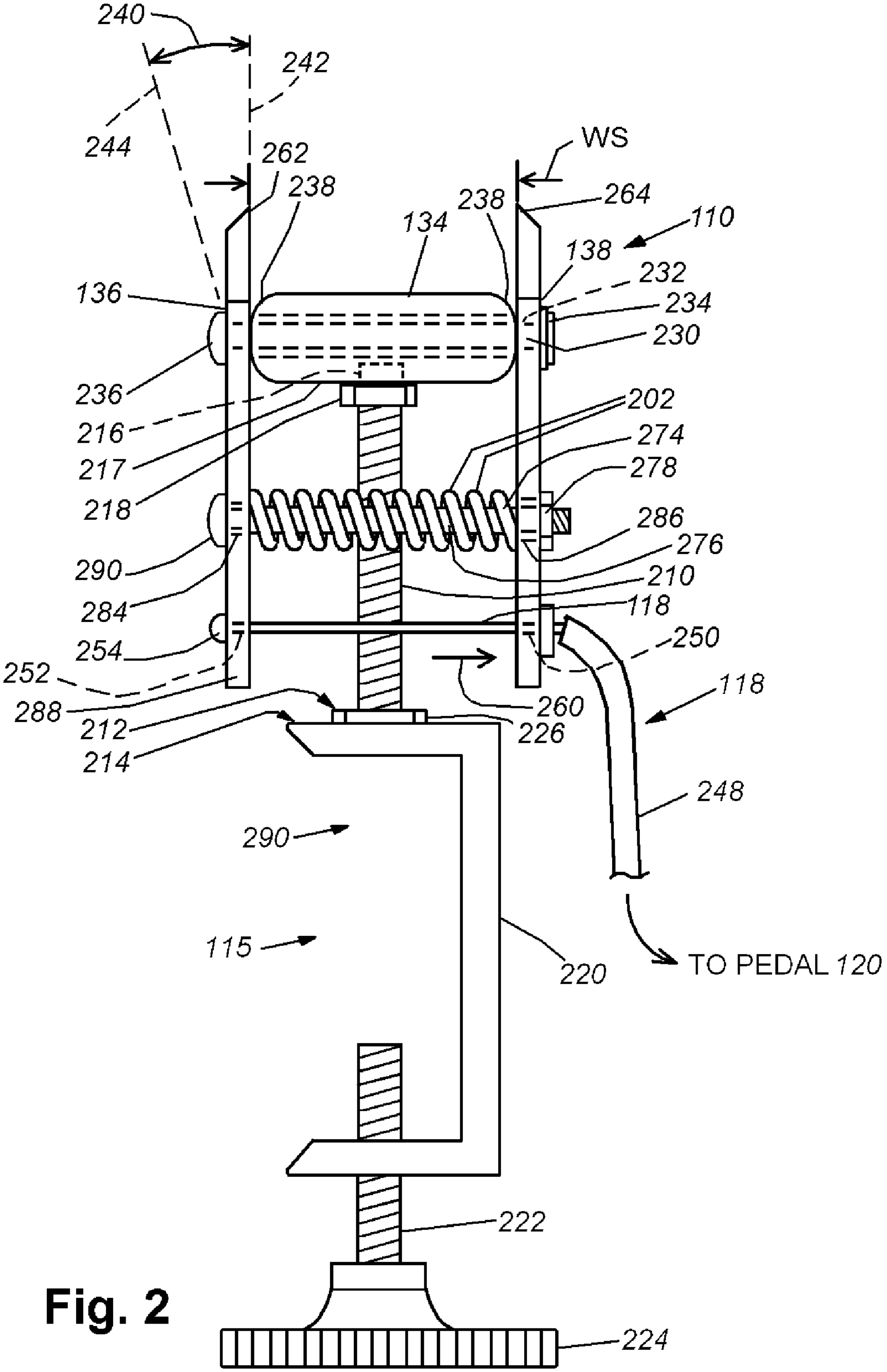
FIG. 2 is a side view of the clamp assembly, according to the illustrative embodiment.

FIG. 2 is a view of the clamp head assembly 110 and the clamping device 115, showing their component parts. The clamp head assembly 110 is comprised of clamp plates 136, 138, a clamp ski support 134, a plurality of spring assemblies 202, a cable 118, and a vertical support bolt 210. The clamping device 115 is comprised of a rigid clamping yoke 220, a clamp bolt 222 with a rotatable knob 224. The spring assemblies are depicted herein as constructed and arranged with conventional coiled springs.

The clamp head assembly 110 is connected to the clamping device 115 by the vertical support bolt 210 that is sufficiently rigid and sturdy to support the head assembly during operation. The thickness of bolt 210 is one quarter inch (6.25 mm) or greater in an embodiment. The bottom end 212 of the bolt 210 is secured to the top surface 214 of yoke 220 at joint 226 that can be secured by at least one of a threaded jointure, a welded joint, or another connective mechanism. The top 216 of the bolt 210 is secured into the bottom surface 217 of the ski clamp support 134 by a threaded hole and this joint is supported by a locking nut 218. The material of the ski clamp support 134 is a synthetic polymer (for example, nylon). In other embodiments, the ski clamp support 134 can be constructed of a natural polymer (for example, rubber) or a non-polymer (for example, wood). The ski clamp support 134 is transversely bisected by a pair of through-bolts 230 that engage the clamp plates 136, 138 and are situated in respective through-holes 232. In other embodiments, one, three or more through-bolts and respective through-holes can be present. The through-bolts 230 each are provided with proud bolt heads 234 and retaining nuts 236. The end surfaces 238 of the ski clamp support 134 are rounded. This rounding allows the through-bolts to act as a fulcrum for the movement 240 of the clamp plates 136, 138. The range of movement 240 is defined as the movement from a vertical axis 242 that is established when the clamp plates 136, 138 are resting and the outer movement limit 244 that describes the maximum opening position of the clamp plates 136, 138. This range of movement is approximately one quarter inch (6.25 mm). In other embodiments, the range of movement can be greater or lesser.

The cable 118 passes through an outer sheath 248, passes through through-hole 250 in clamp plate 138 and through-hole 252 in clamp plate 136 and is retained by cable retainer 254. The cable 118 can be a standard commercially available bicycle cable. When the foot pedal (not shown) is actuated, the cable is retracted in direction 260. This movement causes a force to be applied to clamp plate 136, causing the top end 262 of clamp plate 136 to begin moving, compressing the clamp plate 136 against spring assembly 202. The spring assembly 202 is comprised of a spring 274, a through bolt 276 and retaining nut 278. In an embodiment, a pair of spring assemblies is provided. It is expressly contemplated that there can be more or less than two spring assemblies provided. Each through-bolt passes through through-holes 284, 286 in respective clamp plates 136, 138. When the cable 118 is retracted, it causes the bottom end 288 of clamp plate 136 to move, applying force to each of the spring assemblies 202 by the confrontation of the clamp plate 136 against the bolt heads 290. This in turn causes the bolts 276 to be moved through the through-holes 286 and compression of the spring 274. The clamp plate 136 then moves through its range of motion 240 to its outer movement limit 244, at which point the clamp assembly is fully open and the ski can be re-positioned, removed or replaced. It is expressly contemplated that the clamp support width WS will vary depending on the type of ski. For example, most touring, racing and skating skis are in the range of 50 mm to 70 mm. There is sufficient play in the clamp assembly to provide for switching between skis of similar or nearly similar widths. For operation on wider Alpine skis, back country/mountaineering and jumping skis, it is contemplated that an interchangeable clamp support with a greater width and longer related parts can be provided as part of a kit and be installed to provide operating on wider skis and snowboards. In an embodiment, the outer surfaces of top ends 262, 264 are coated with an elastomeric polymer or a sleeve covering that provides a cushion for the skis to rest against to prevent surface damage to the skis when engaged in the mechanism.

The clamping device 115 removably secures the clamp assembly to a surface. The yoke 220 is provided with an interior 290 that is sized and constructed to admit a working structure (i.e., a work table edge, board edge or another structure). The clamp bolt 222 and rotatable knob 224 are constructed and arranged to removably engage the working structure and maintain stability and fixation so that the clamp assembly is held securely. It is contemplated that the rotatable knob can be replaced with a handle, handle bar or another mechanism. It is further contemplated that the clamp bolt 222 can be constructed and arranged with a clamp shoe. In another embodiment, the clamp assembly can be permanently secured to the working structure via bolts or other fixments.

The bolts and clamping device can be constructed from metal products, for example steel and/or aluminum, a rigid polymer, or a combination thereof.

The clamp head assembly 110 is presented with three configurations. The closed configuration is defined as the clamp assembly 110 in a resting state without an engaged ski. The open configuration is defined as the cable 118 fully retracted, causing the clamp plate 138 to confront and compress the spring assembly 202 with the clamp plate 138 moved to the fullest extent of its outward movement 240. The engaged configuration is defined as the clamp head assembly 110 in the closed configuration with a ski engaged and the clamp plate 136 confronting the side wall of the engaged ski.

Figure 3:
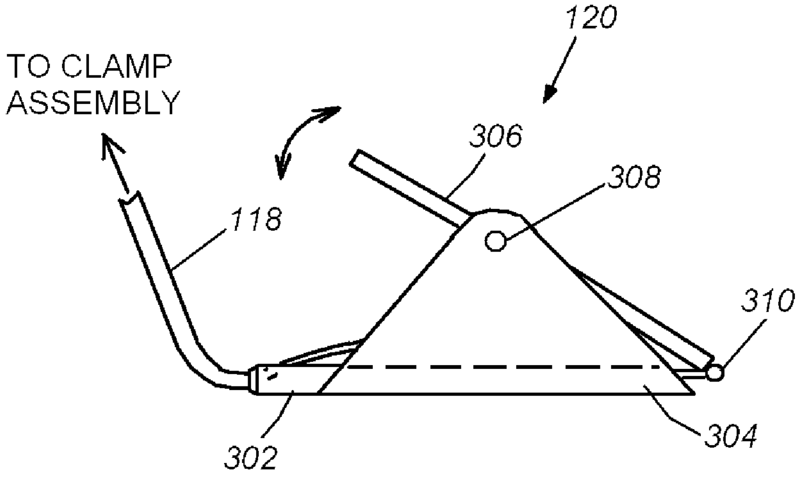
FIG. 3 is a side view of a pedal assembly for the clamp assembly, according to the illustrative embodiment.

FIG. 3 is a side view of the pedal assembly 120. The pedal assembly is comprised of the pedal base 302, a pair of pedal sides 304, a foot pedal 306, a foot pedal axle 308 and a cable terminus 310 located at the rear of the foot pedal 306.

Figure 4:
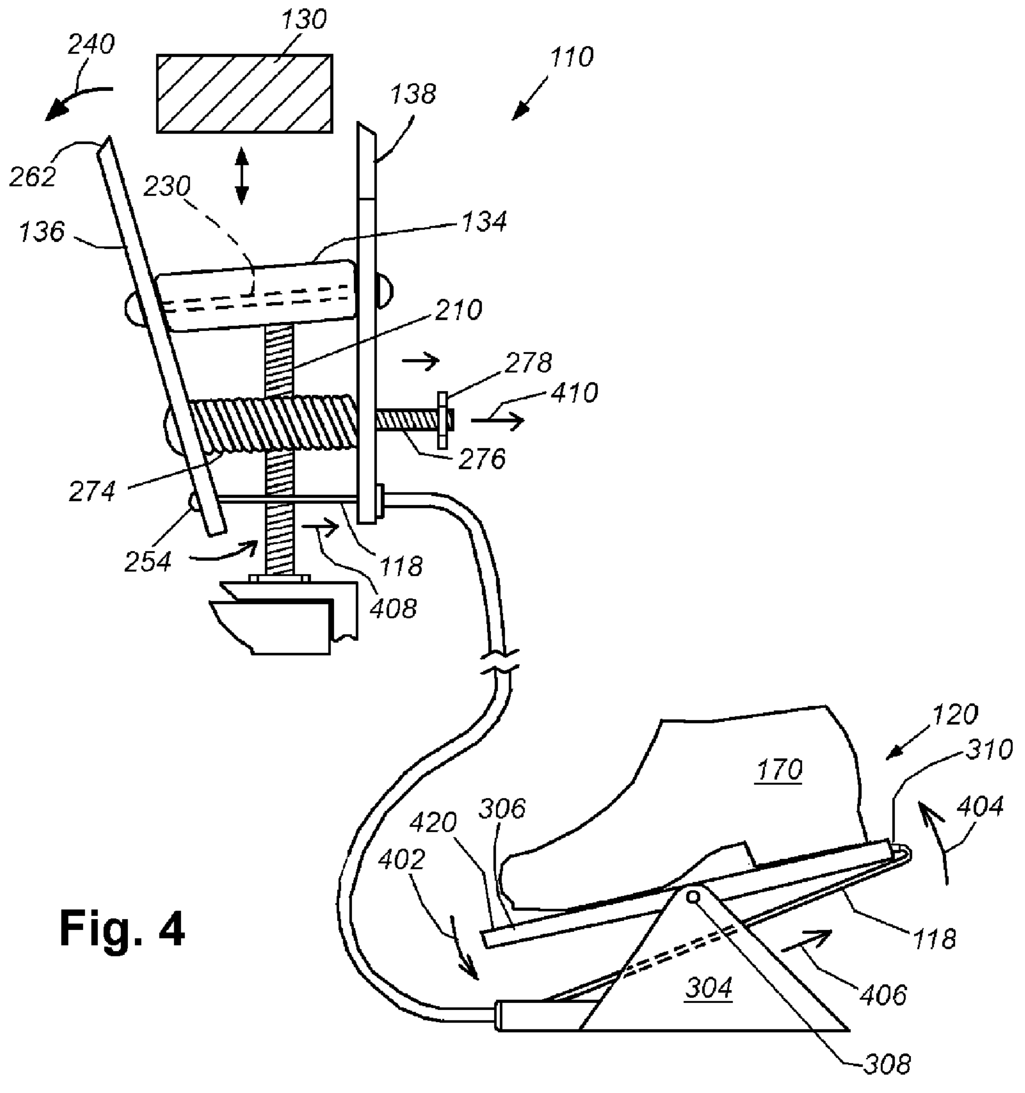
FIG. 4 is a schematic view of the clamp assembly in motion after actuation is commenced, according to the illustrative embodiment.

FIG. 4 shows the actuation of the clamp assembly 110 in operation. At the beginning of this actuation operation, the clamp assembly 110 is in a closed orientation, defined as both the clamp plates 136, 138 in a vertical orientation, with or without an engaged ski resting on the clamp support 134. The actuation begins when the operator's foot 170 is placed onto the foot pedal 306 of the pedal assembly 120. When the foot 170 is pressed downward in a motion 402, the foot pedal 306 pivots on the axle 308 and the rear of the pedal rises in a motion 404. The cable 118 is affixed to the pedal at terminus 310 and is pulled in direction 406 by the rising motion 404 of the pedal. The movement 406 of the cable causes the cable retainer 254 to be moved in motion 408. Through-bolt 276 is displaced outward in motion 410 against the bias of the spring 274 as it is compressed. This motion in turn causes the top 262 of the clamp plate 136 to rotate outwards through its range of motion 240 and to pivot around the through-bolt 230. The clamp assembly is now in an open configuration, defined as the clamp plate 138 being in a vertical orientation with the clamp plate 136 exercised through its range of motion to be at or near the outer movement limit 244. The open configuration remains so long as the pedal 306 has been moved through range of motion 402. The cable movement is approximately one eighth to one quarter inch (3 mm to 6.25 mm). When the clamp assembly is the open configuration, a ski can be placed into and/or removed from the clamp assembly 110. In other embodiments, this movement range can be greater or lesser to accommodate skis of different widths and/or snowboards.

When foot 170 is removed from the pedal 306, the normal bias of the spring 274 causes a retraction of the bolt 278 and a movement of the clamp plate 136 from the open configuration to a closed configuration. This in turn draws the cable 118 from the direction of the pedal assembly 120 towards the clamp head assembly 110, drawing the rear of the pedal downwards and the front of the pedal 420 upwards.

Note that where the ski clamp is adapted particularly for use with somewhat flexible skis, like cross-country skis, it can be used in conjunction with a conventional or custom contoured base that approximately conforms with the camber of the ski (when placed upside-down), and that against which the ski is retained by the clamping device (with sufficient holding and friction force to counter act the inherent spring in the ski). This allows the ski to be maintained at a desired profile as the bottoms are tuned. Such contoured (hold-down) bases for tuning cross country skis can be adapted for tabletop use or place on legs to be used at a meet or other remote site.

Note also, as used herein the directional terms, such as, but not limited to, "up" and "down", "upward" and "downward", "rearward" and "forward", "top" and "bottom", "inside" and "outer", "front" and "back", "inner" and "outer", "interior" and "exterior", "downward" and "upward", "upside-down", "horizontal" and "vertical" should be taken as relative conventions only, rather than absolute indications of orientation or direction with respect to a direction of the force of gravity.

It should be clear to one of ordinary skill that the foregoing describes a system that has a minimum of parts, is readily used and greatly simplifies the process of interchanging and retaining skis in a position to perform maintenance and other operations.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the clamp plates can be constructed of woods, resins or nonmetallic materials. The clamp assembly can be integrated as a permanently mounted accessory on a fixed or portable ski table. The pedal actuation can be hand operated with a squeezable device or a knee operated device. The clamp assembly can be provided with a single spring assembly, or more than two spring assemblies. The cable can be provided with a second cable that is affixed to an opposing side plate such that actuation of the pedal causes a counter-poised movement of the clamp plates. While depicted above as coil springs, the spring assemblies can be constructed and arranged with Belleville washer assemblies, leaf springs, a compressible torsion member or another spring-like mechanism. Accordingly, this description is meant to be taken only by way of example, and not to otherwise limit the scope of this invention.

What is claimed is:

1. A ski hold-down clamp with actuation pedal is comprised of:

a clamp head assembly that is comprised of a pair of counterpoised clamp plates, a clamp ski support, at least one spring assemblies and a vertical support bolt;

a clamping device;

a cable; and a pedal assembly.

2. The ski hold-down clamp of claim 1, wherein the clamp head assembly has two spring assemblies operatively connected thereto.

3. The ski hold-down clamp of claim 1, wherein the pedal assembly is interconnected with a cable that moves in response o movement of the pedal assembly, thereby drawing a bottom of a clamp plate against a bias of the spring assembly, and thereby moving a top of the clamp plate from a closed configuration to an open configuration.

4. The ski hold-down clamp of claim 1, wherein the pedal assembly is arranged to be hand operated.

5. The ski hold-down clamp of claim 1, wherein the pedal assembly is arranged to be knee operated.

6. The ski hold-down clamp of claim 1, wherein the clamp plate is arranged to confront a sidewall of a ski.

7. The ski hold-down clamp of claim of claim 3, wherein a ski is removably engaged between a plurality of clamp plates in a closed configuration.

8. The ski hold-down clamp of claim 1 further comprising a clamp bolt and knob to removably secure the clamping device to a supporting surface.

9. The ski hold-down clamp of claim 1 wherein the clamping plates are arranged to removably secure sides of a cross country ski.

* * * * *